(No Model.)
A. P. GOULD.
TROLLEY WIRE SUPPORT AND COUPLING.
No. 529,903. Patented Nov. 27, 1894.
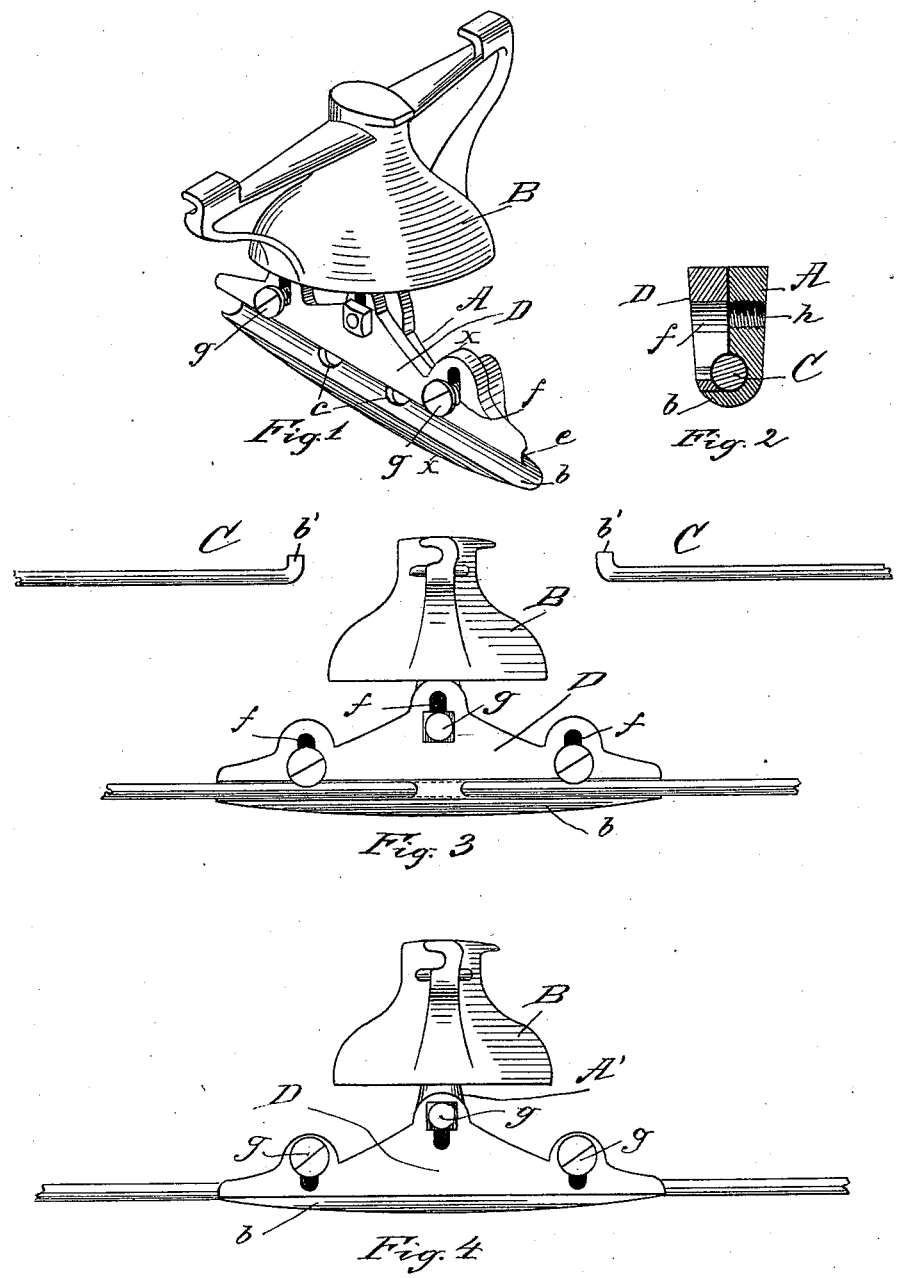
WITNESSES
INVENTOR
Aaron P. Gould
By W. K. Miller
Attorney

United States Patent Office.

AARON P. GOULD, OF CANTON, OHIO.

TROLLEY-WIRE SUPPORT AND COUPLING.

SPECIFICATION forming part of Letters Patent No. 529,903, dated November 27, 1894.

Application filed March 7, 1894. Serial No. 502,732. (No model.)

*To all whom it may concern:*

Be it known that I, AARON P. GOULD, a citizen of the United States, and a resident of Canton, county of Stark, State of Ohio, have invented a new and useful Improvement in Trolley-Wire Supports and Couplings, of which the following is a full, clear, and exact description, reference being had to the accompanying drawings, making part of this specification.

My invention relates to improvements in trolley wire supports and couplings, and consists in certain features of construction and combination of parts as will be hereinafter described and claimed.

Figure 1, is a view in perspective showing my invention open for the reception of the trolley wire. Fig. 2, is a section through $x\,x$. Fig. 3, is a side elevation showing the invention when used as a coupler, showing the wire out of, and in operative position. Fig. 4, is a similar view showing the parts secured on the wire in operative position.

A represents the trolley wire support, the upper end portion of which is secured in a bell shaped water shed B, having side arm and hook, by which it is secured to a supporting cross wire.

At the lower side of the support A, is provided an offset or shelf like portion $b$, to receive, and upon which is supported the trolley wire as shown. In the body portion of the support are provided perforations $c$ adapted to receive the bent end portions $d$ of the wire C, when the support is used for a coupling.

To secure the wire or wires in position, a slidable portion or cap D is provided, having its lower edge cut as shown at $e$, to conform to the trolley wire, and elongated apertures $f$, to secure the cap D in position. To hold the wire, screws $g$, are passed through the apertures $f$ and turned into threaded apertures $h$, in the support A.

In operation as a trolley wire support, the wire is placed on the ledge or shelf portion as shown in Fig. 3, by the wires C, and dotted lines indicating a continuous wire. The cap D is then closed down over the wire as shown in Fig. 4, and secured in position by the screws $g$, and to remove the wire or wires, the screws $g$ are slacked or turned back to release the cap which may be raised as shown in Fig. 3.

The support and coupler is preferably made of brass. The shank portion A' is secured in the water shed B, by the use of a hard rubber packing, formed in the usual way.

Having thus fully described the nature and object of my invention, what I claim is—

1. The combination in a trolley wire support and coupling of the body portion A, having at its lower edge a ledge $b$, and perforations $c$, the bent end portions $b'$, of the trolley wire, and the slidable securing cap D, substantially as described and for the purpose set forth.

2. The combination in a trolley wire support, of the body portion A, having at its lower edge a projecting ledge $b$, a cap D, having elongated apertures, and the binding screws $g$, substantially as described and for the purpose set forth.

In testimony whereof I have hereunto set my hand this 2d day of March, A. D. 1894.

AARON P. GOULD.

Witnesses:
W. K. MILLER,
BURT. A. MILLER.